United States Patent
Ye et al.

(10) Patent No.: US 7,690,839 B2
(45) Date of Patent: Apr. 6, 2010

(54) THERMAL TESTING APPARATUS

(75) Inventors: Zhen-Xing Ye, Shenzhen (CN); Ke Sun, Shenzhen, CA (US); Xiao-Zhu Chen, Shenzhen (CN); Ming-Ke Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 16 days.

(21) Appl. No.: 11/842,165

(22) Filed: Aug. 21, 2007

(65) Prior Publication Data

US 2009/0052495 A1    Feb. 26, 2009

(51) Int. Cl.
*G01N 3/60* (2006.01)
*G01N 25/00* (2006.01)
*G01K 7/00* (2006.01)

(52) U.S. Cl. .............................. 374/57; 374/5; 374/141; 374/163

(58) Field of Classification Search .................. 374/57
See application file for complete search history.

(56) References Cited

U.S. PATENT DOCUMENTS 5,721,455 A   2/1998  Takashita
5,980,103 A * 11/1999 Ikuno et al. ................... 374/57
6,336,592 B1 * 1/2002 Russell et al. ............... 236/49.3
6,826,456 B1 * 11/2004 Irving et al. ................. 361/695
7,031,154 B2 * 4/2006 Bash et al. ................... 361/690
7,318,672 B2 * 1/2008 Hardcastle, III ............. 374/109
7,336,153 B2 * 2/2008 Malone et al. ............. 340/10.1
2003/0214781 A1 * 11/2003 Kolb et al. ................... 361/687
2004/0128101 A1 * 7/2004 Hermerding, II ............ 702/136
2004/0264124 A1 * 12/2004 Patel et al. ................... 361/686
2005/0043907 A1 * 2/2005 Eckel et al. ................... 702/62
2005/0172158 A1 * 8/2005 McClendon et al. ........ 713/300
2007/0291817 A1 * 12/2007 Bradicich et al. ............. 374/15
2009/0052496 A1 * 2/2009 Sone et al. ................... 374/141
2009/0190625 A1 * 7/2009 Chung et al. ................... 374/11
2009/0207880 A1 * 8/2009 Ahladas et al. ............. 374/141

* cited by examiner

*Primary Examiner*—Gail Verbitsky
*Assistant Examiner*—Mirellys Jagan
(74) *Attorney, Agent, or Firm*—Frank R. Niranjan

(57) ABSTRACT

A thermal testing apparatuses for a server system (22) includes a heating module (16), at least one temperature sensor (191), a micro control unit (MCU) (192), a trigger controlling circuit (193) and a display module (20). The heating module heats airflow at an entry of the server system. The temperature sensor senses temperature at the entry of the server system, and outputs temperature signals. The MCU receives temperature signals and converts them to temperatures in degrees. The trigger controlling circuit is electrically connected to the MCU to receive a controlling signal, and controls turning the heating module on or off. The display module is electrically connected to the MCU for showing the temperatures in degrees.

12 Claims, 3 Drawing Sheets

THERMAL TESTING APPARATUS

BACKGROUND

1. Field of the Invention

The present invention relates to testing apparatuses, and particularly to a testing apparatus that can preheat airflow at an entry of a server system during testing.

2. Description of Related Art

Thermal characteristics are one of the most important factors affecting reliability and stability of a computer. So before designing a server system, designers need to perform reliability tests on the server system. Usually designers can only do the tests at ambient temperatures, the temperature range is often so narrow that the tests are not comprehensive. Designers sometimes will not find deficiencies of the server system, which may have serious consequences when the server system design is finished and the computers are manufactured in large amounts.

What is needed, therefore, is to provide a testing apparatus which can preheat airflow at an entry of a server system so that a designer can test reliability of the server system within a greater temperature range.

SUMMARY

An exemplary thermal testing apparatus for a server system includes a heating module, at least one temperature sensor, a micro control unit (MCU), a trigger controlling circuit, and a display module. The heating module heats airflow at an entry of the server system. The temperature sensor senses temperature of the air at the entry of the server system, and outputs temperature signals. The MCU receives the temperature signals and processes them to send to the display as temperature in degrees. The trigger controlling circuit is electrically connected to the MCU to receive a controlling signal, and controls turning on or off the heating module. The display module is electrically connected to the MCU for showing the airflow temperatures in degrees.

Other objects, advantages and novel features of the present invention will become more apparent from the following detailed description of preferred embodiments when taken in conjunction with the accompanying drawings, in which:

DETAILED DESCRIPTION

Figure 1:
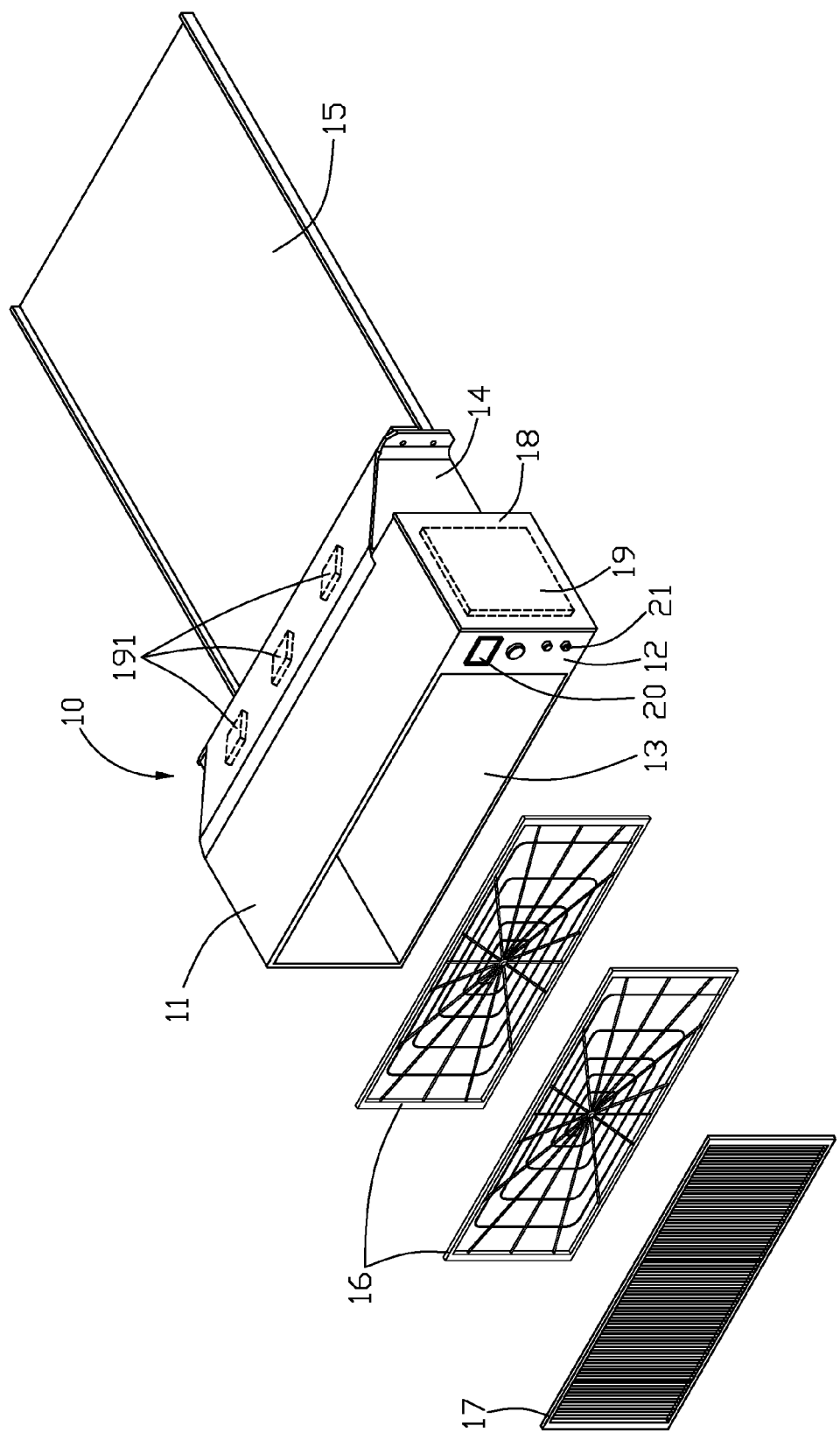
FIG. 1 is an exploded, isometric view of a thermal testing apparatus in accordance with an embodiment of the present invention.
Figure 2:
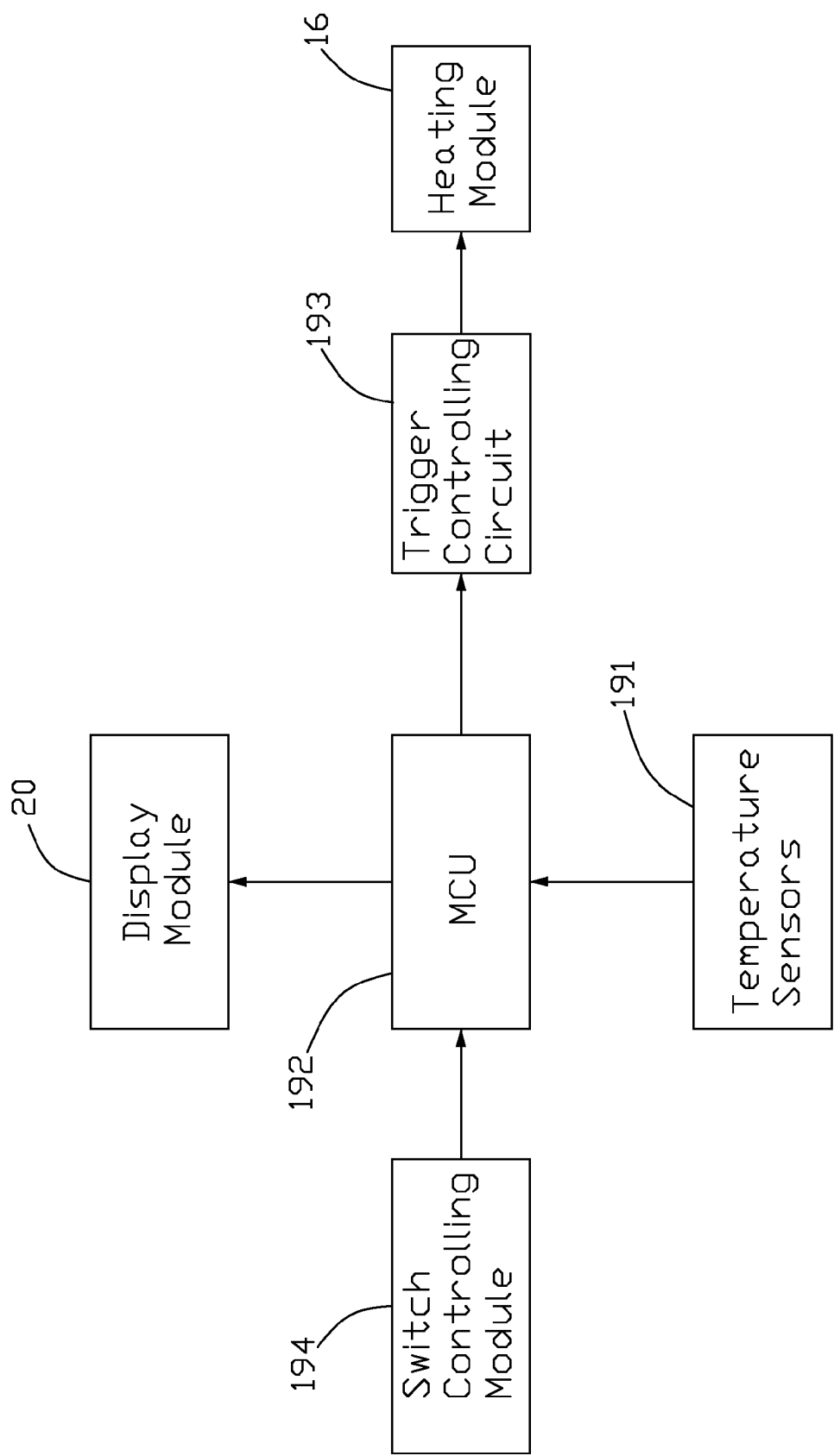
FIG. 2 is a block diagram of FIG. 1.
Figure 3:
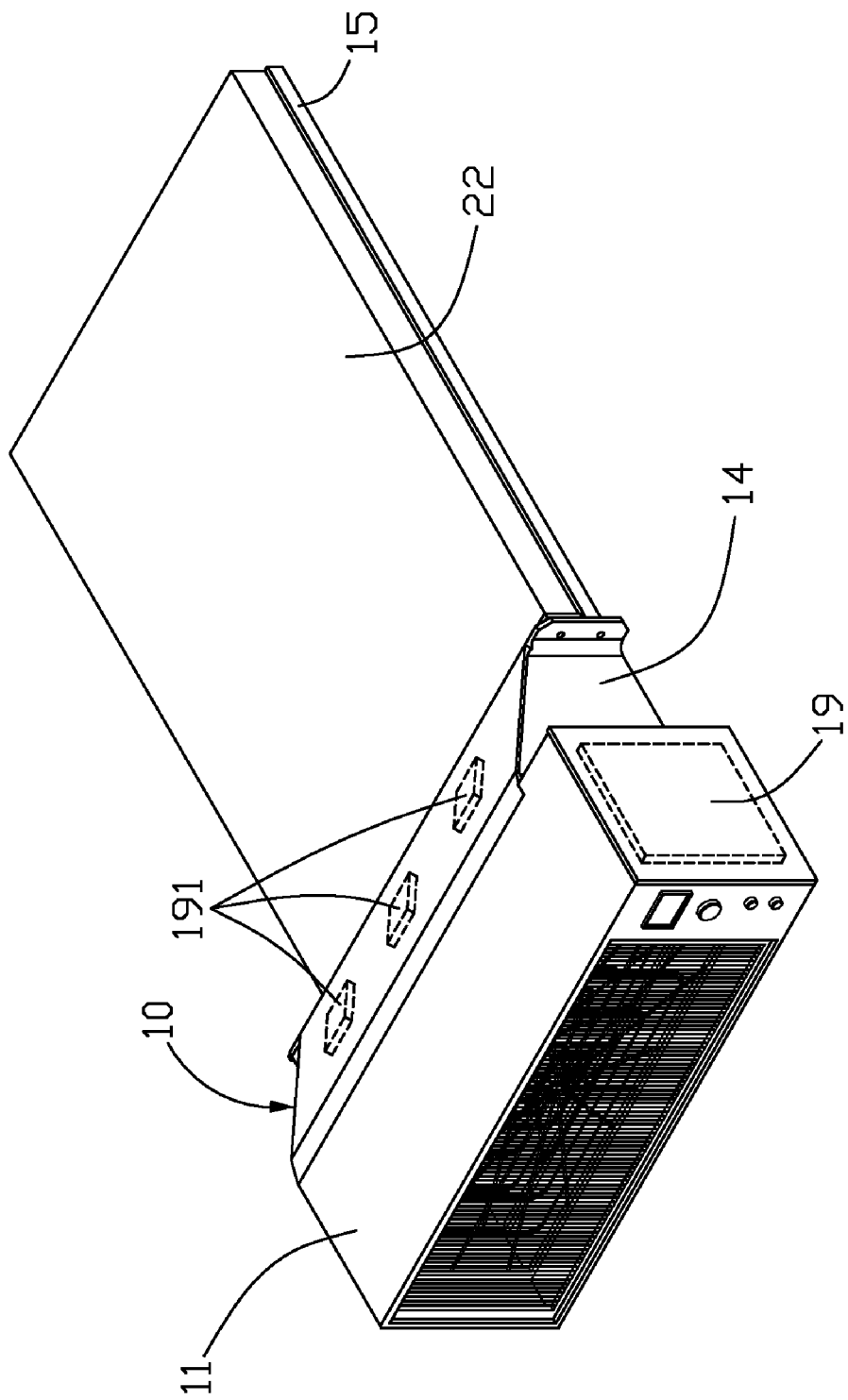
FIG. 3 is an assembled view of FIG. 1, with the thermal testing apparatus attached to a server system.

Referring to FIGS. 1 and 2, a thermal testing apparatus in accordance with an embodiment of the present invention is provided for preheating airflow at an entry of a server system 22 (see FIG. 3). The testing apparatus includes a chassis 10. The chassis 10 includes a chamber 11 in the front thereof, a fan duct 14 disposed at the back of the chamber 11, and a long holding board 15 disposed at the back of the fan duct 14. The chamber 11 has a front panel 12 defining a rectangular opening 13 therein, and a side panel 18. A heating module 16 having a same shape as the opening 13 is installed in the opening 13, and a dust filter 17 is installed on the heating module 16 to prevent dust entering the server system 22 via the fan duct 14. The front panel 12 of the chassis 10 has a display module 20 and a plurality of switch controlling buttons 21 thereon. A circuit board 19 is attached to an inner side of the side panel 18. A plurality of temperature sensors 191 is separately disposed at different portions of inner surfaces of the fan duct 14. Preferably, the temperature sensors 191 are located near an air outlet of the fan duct 14 disposed at the back thereof, that is, near an entry of the server system 22. A micro control unit (MCU) 192, a trigger controlling circuit 193, and a switch controlling module 194 are installed on the circuit board 19.

In this embodiment, the heating module 16 is composed of heat radiating wires arranged in web-like patterns attached to two frames. The MCU 192 is a single chip microcomputer (SCM). The display module 20 is a liquid crystal display (LCD).

The switch controlling buttons 21 are electrically connected to an input terminal of the MCU 192 via the switch controlling module 194. An output terminal of the MCU 192 is electrically connected to the heating module 16 via the trigger controlling circuit 193. The temperature sensors 191 are electrically connected to the display module 20 via the MCU 192.

Referring also to FIG. 3, the server system 22 is placed onto the holding board 15 and the testing apparatus is powered up. The MCU 192 is initialized and drives the trigger controlling circuit 193 and the temperature sensors 191 to work. The trigger controlling circuit 193 drives the heating module 16 to work, and the heating module 16 heats airflow from a fan (not shown) which is located adjacent the front side of the chamber 11 for blowing the airflow into the chamber 11, at the entry of the server system 22. The temperature sensors 191 sense temperatures at corresponding positions at the entry of the server system 22, and transmit them to the MCU 192. The MCU 192 converts the data of the temperature signals to temperatures in degrees, and then the MCU 192 controls the display module 20 to selectively display the temperatures in degrees according to which of the switch controlling buttons 21 have been pressed. When the temperature reaches a certain point, the MCU 192 will send a controlling signal to the trigger controlling circuit 193 to turn off the heating module 16. At this time, the designer can test reliability of server systems corresponding to this certain temperature. By the same way, the designer can test reliability of server systems corresponding to other certain temperature. Thereby, designers can conveniently test reliability of server systems under different working conditions, and use the data to design an optimal server system.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A thermal testing apparatus for testing reliability of a server system, comprising:

a heating module configured for heating airflow at an entry of the server system, wherein the heating module is composed of at least a heat radiating wire;

at least one temperature sensor configured for sensing temperature of the airflow at the entry of the server system, and outputting temperature signals;

a micro control unit (MCU) coupled to the at least one temperature sensor configured for converting the temperature signals to temperatures in degrees;

a trigger controlling circuit electrically connected to the MCU to receive a controlling signal related to the temperature signals and control turning on or off of the heating module based on the controlling signal; and a display module electrically connected to the MCU for showing the temperature in degrees.

2. The thermal testing apparatus as claimed in claim 1, wherein the MCU is a single chip microcomputer (SCM).

3. The thermal testing apparatus as claimed in claim 1, wherein the display module is a liquid-crystal display (LCD).

4. The thermal testing apparatus as claimed in claim 1, further comprising a switch controlling module electrically connected to the MCU, wherein the at least one temperature sensor comprises a plurality of temperature sensors located near an entry of the server system, the switch controlling module controls the MCU to select the temperature in degrees of airflow at a corresponding temperature sensor to be shown on the display module.

5. The thermal testing apparatus as claimed in claim 4, further comprising a chassis including a chamber in the front thereof, and a long holding board at the back thereof for receiving the server system; wherein the chamber has a front panel defining a rectangular opening therein, the heating module having a shape suitable to the opening is installed in the opening, a circuit board is attached to an inner side of the chamber, a fan duct is disposed at the back of the chamber, the temperature sensors are disposed at different portions of inner surfaces of the fan duct, wherein the MCU, the trigger controlling circuit, and the switch controlling module are integrated in the circuit board.

6. The thermal testing apparatus as claimed in claim 5, wherein a plurality of switch controlling buttons are disposed on the front panel of the chamber, the switch controlling buttons are connected to the MCU via the switch controlling module.

7. The thermal testing apparatus as claimed in claim 5, wherein the display module is disposed on the front panel of the chamber.

8. The thermal testing apparatus as claimed in claim 5, wherein a dust filter is installed on the front panel of the chamber and covers the heating module.

9. A thermal testing apparatus for a server system, comprising:

a chassis comprising a chamber with a front panel defining an opening, and a fan duct disposed at a rear side of the chamber and connecting with an entry of the server system, the fan duct communicating with the chamber and the entry of the server system;

a heating module disposed in the chamber and configured for heating airflow which blows through an opening of the chassis and then enters into the server system;

a plurality of temperature sensors disposed at different portions of inner surfaces of the fan duct configured for sensing temperature of the airflow at the entry of the server system, and outputting temperature signals;

a micro control unit (MCU) coupled to the temperature sensors configured for converting the temperature signals to temperatures in degrees;

a trigger controlling circuit coupled to the MCU to receive a controlling signal related to the temperature signals and control turning on or off of the heating module based on the controlling signal; and a display module electrically connected to the MCU for showing the temperature in degrees.

10. The thermal testing apparatus as claimed in claim 9, further comprising a plurality of switch controlling buttons respectively corresponding to the temperature sensors, and a switch controlling module electrically connected the MCU with the switch controlling buttons, wherein the switch controlling module is capable of controlling the MCU to select the temperature in degrees of airflow at a corresponding temperature sensor to be shown on the display module according to the corresponding switch controlling button being pressed.

11. The thermal testing apparatus as claimed in claim 10, further comprising a circuit board attached to an inner side wall of the chassis, wherein the MCU, the trigger controlling circuit, and the switch controlling module are installed on the circuit board.

12. The thermal testing apparatus as claimed in claim 10, wherein the switch controlling buttons and the display device are attached on the front panel of the chamber.

* * * * *